(12) United States Patent
Ben-Shalom et al.

(10) Patent No.: US 11,507,656 B2
(45) Date of Patent: Nov. 22, 2022

(54) RANSOMWARE DETECTION AND REMEDIATION

(71) Applicant: Intel Corporation, Santa Clara, CA (US)

(72) Inventors: Omer Ben-Shalom, Rishon le-Tzion (IL); Alex Nayshtut, Gan Yavne (IL); Behnam Eliyahu, Petah Tikva (IL); Denis Klimov, Beer Sheba (IL)

(73) Assignee: INTEL CORPORATION, Santa Clara, CA (US)

( * ) Notice: Subject to any disclaimer, the term of this patent is extended or adjusted under 35 U.S.C. 154(b) by 77 days.

(21) Appl. No.: 17/132,934

(22) Filed: Dec. 23, 2020

(65) Prior Publication Data

US 2021/0150025 A1    May 20, 2021

(51) Int. Cl.
| | |
|---|---|
| *G06F 21/55* | (2013.01) |
| *G06F 21/56* | (2013.01) |
| *G06F 21/57* | (2013.01) |
| *G06F 21/62* | (2013.01) |

(52) U.S. Cl.
CPC ......... *G06F 21/552* (2013.01); *G06F 21/554* (2013.01); *G06F 21/566* (2013.01); *G06F 21/577* (2013.01); *G06F 21/6218* (2013.01); *G06F 2221/034* (2013.01)

(58) Field of Classification Search
CPC .... G06F 21/552; G06F 21/554; G06F 21/566; G06F 21/577; G06F 21/6218; G06F 2221/034
See application file for complete search history.

(56) References Cited

U.S. PATENT DOCUMENTS

| | | | | |
|---|---|---|---|---|
| 9,122,402 | B2* | 9/2015 | Gantman | G06F 3/0659 |
| 10,009,360 | B1* | 6/2018 | Todd | H04L 63/145 |
| 10,671,724 | B2* | 6/2020 | Boutnaru | G06F 21/566 |
| 11,126,712 | B2* | 9/2021 | Kang | G06F 21/566 |
| 2012/0255013 | A1* | 10/2012 | Sallam | G06F 21/564 |
| | | | | 726/24 |
| 2018/0157834 | A1* | 6/2018 | Continella | G06F 21/554 |
| 2020/0089884 | A1* | 3/2020 | Winokur | G06F 21/566 |

* cited by examiner

*Primary Examiner* — Christopher A Revak
(74) *Attorney, Agent, or Firm* — Jaffery Watson Mendonsa & Hamilton LLP (57) ABSTRACT

A system and method of detecting and remediating attacks includes receiving operating system (OS) read/write data from an OS, the OS read/write data describing at least one of reads from and writes to a storage device over a file system interface of the OS; collecting storage device read/write data, the storage device read/write data describing at least one of reads from and writes to the storage device; comparing the OS read/write data to the storage device read/write data; and determining if there is a discrepancy between the OS read/write data and the storage device read/write data. If there is a discrepancy, determining if there is an anomaly detected between OS read/write data and the storage device read/write data. If there is an anomaly, causing a remediation action to be taken to stop a malware attack.

21 Claims, 5 Drawing Sheets

| 241 0XF1 | TOTAL LBAS WRITTEN | 402 |
| 242 0XF2 | TOTAL LBAS READ | 404 |
| 243 0XF3 | TOTAL LBAS WRITTEN EXPANDED | 406 |
| 244 0XF4 | TOTAL LBAS READ EXPANDED | 408 |
| 249 0XF9 | NAND WRITES (1 GB) | 410 |

RANSOMWARE DETECTION AND REMEDIATION

FIELD

Embodiments relate generally to computer security, and more particularly, to detecting and remediation of ransomware in computing systems.

BACKGROUND

Ransomware is one of the current top threats to computer security, impacting both businesses and consumers. Ransomware is malicious software (e.g., malware) that typically infects a computing system by encrypting at least some of the data on storage devices of the computing system and displaying messages demanding a fee to be paid in order for the data to be decrypted. This class of malware is a criminal moneymaking scheme that can be installed through deceptive links in an email message, instant message or website. Computer security companies are expending significant efforts in detecting and eradicating such threats by monitoring and analyzing disk accesses to storage devices as well as by planting decoy files. Unfortunately, these techniques are only valid against malware that encrypts files using operating system (OS) interfaces. Some new malware is adapted to use direct accesses to the storage device (e.g., bypassing the legitimate OS interfaces) as an evasion technique.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Implementations of the disclosure provide a method and system that compares read/write data from one or more drivers of the operating system (OS) with read/write data from a storage device (SD) (such as a solid-state drive (SSD)) to detect evasive and/or unauthorized read/write operations by ransomware. In an embodiment, block level access statistics derived from two sources, one trusted (such as a storage device controller in a storage device), and one un-trusted (such as an application program or OS running in a host computing system (e.g., an anti-malware program), are compared. A discrepancy and anomaly detected between the two sources indicates stealthy and/or evasive file write activity associated with malware such as ransomware. Upon detection, one or more remediation actions can be taken to stop the ransomware attack. In some embodiments, the actions include limiting write operations, restoring written blocks, or asking the user for explicit permission to continue writing blocks.

Advantages of embodiments include early detection of malicious cryptographic activity on storage devices indicative of a ransomware attack, the ability to recover from malicious cryptographic activity, and low performance overhead for the detection.

Figure 1:
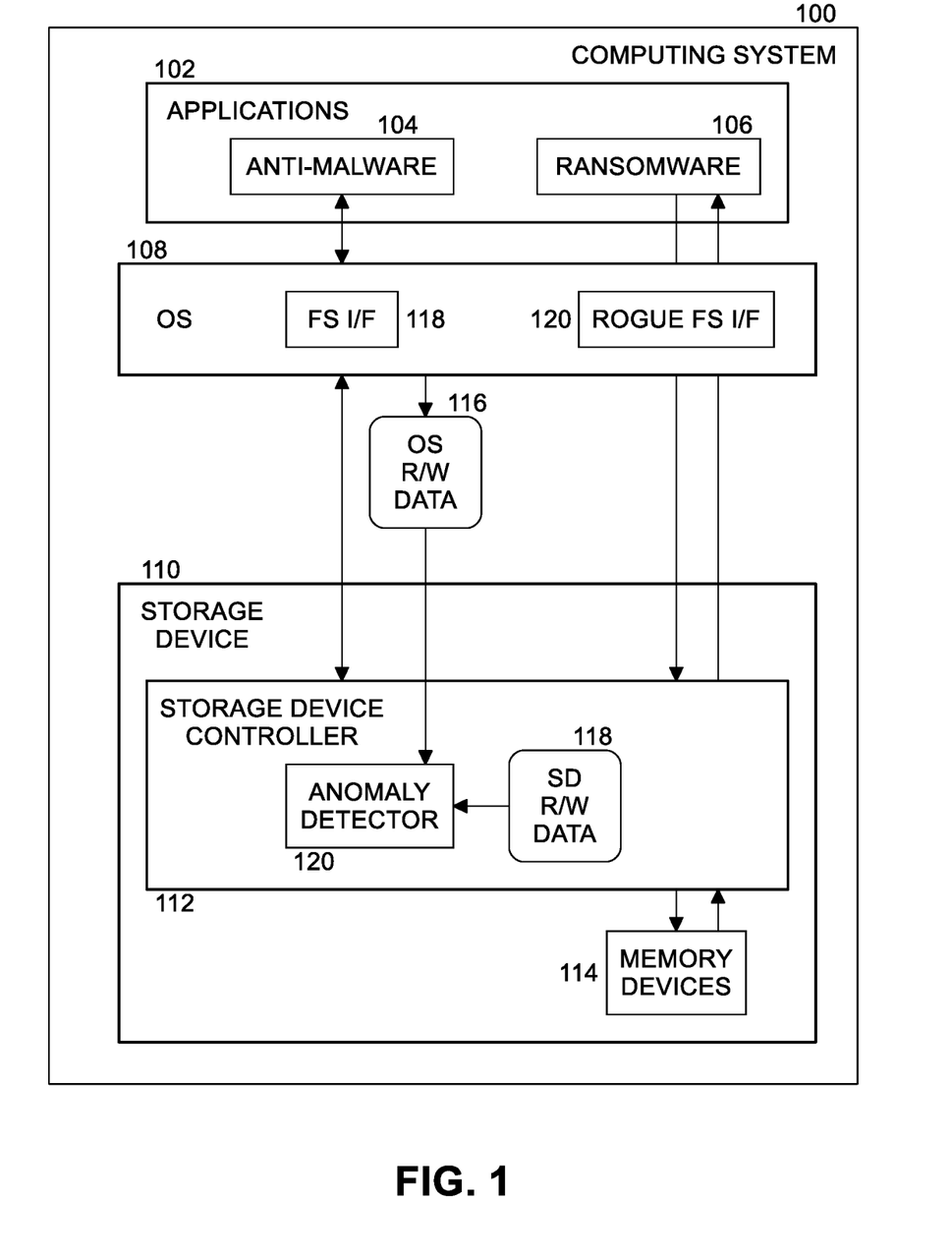
FIG. 1 is a diagram of ransomware detection and remediation according to some embodiments.

FIG. 1 is a diagram of ransomware detection and remediation in a computing system 100 according to some embodiments. Computing system 100 includes one or more applications 102, an OS 108, and at least one storage device 110. In an embodiment, storage device 110 is an SSD. In other embodiments other types of storage devices may be used (e.g., hard disk drives (HDDs), etc.). Storage device 110 includes storage device controller 112 and one or more memory devices 114. Non-limiting examples of such memory devices 114 include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. Anti-malware program 104 is running on computing system 100 to attempt to detect and deter malware such as ransomware 106. When ransomware 106 uses legitimate file system (FS) interfaces (I/Fs) 118 of OS 108 interfaces to read data from and write data to storage device 110 as part of an attack, anti-malware program 104 may be able to detect the attack. However, when ransomware 106 directly accesses storage device controller 112 using "hacker-supplied" rogue FS I/F 120 to read data from and write data to memory devices 114 of storage device 110, anti-malware program 104 may not be able to detect the attack since the ransomware effectively bypasses the legitimate FS I/F 118 of OS 108. Rogue FS I/F 120 is written and loaded into computing system 110 by a hacker/attacker behind ransomware 106. Rogue FS I/F 120 is written to overcome or otherwise defeat legitimate attempts to track read/write activity by anti-malware 104 and/or OS 108.

In another scenario, ransomware 106 may tamper with FS I/F 118 counters and/or audit logs such that FS I/F 118 is still used but related counters have been tampered with by ransomware to hide unauthorized and/or illegitimate activity.

In embodiments, anti-malware 104 monitors read and write activity to storage device 110 through OS 108 by all applications 102, including ransomware 106, through legitimate FS I/F 118. In an embodiment, anti-malware 104 is a stand-alone program. In another embodiment, anti-malware 104 is included in OS 108. In an embodiment, anti-malware 104 sends information to storage device controller 112 over a trusted interface such as a host embedded controller interface (HECI). In an embodiment, the information comprises OS read/write (R/W) data 116, collected by anti-malware 104 by monitoring reads from and write to storage device 110 by applications (including ransomware 106) running on computing system 102 through FS I/F 118. Anti-malware 104 runs as long as computing system 100 is running, continuously monitoring and collecting OS R/W data 116. Anti-malware 104 periodically sends OS R/W data 116 to storage device controller 112 in storage device 110.

In an embodiment, OS R/W data 116 include counts for one or more metrics describing read/write activity from one or more applications 102 to storage device 110. When ransomware 106 uses legitimate FS I/F 118 to access storage device 110, OS R/W data 116 will capture this activity. However, when ransomware 106 does not use legitimate FS I/F 118 and instead uses hacker/attacker supplied rogue FS I/F 120, then OS R/W data 116 will not capture this activity.

If anti-malware program 104 is not operating, this occurrence may be detected due to the lack or insufficiency of OS R/W data 116.

Anomaly detector 120 in storage device controller 112 continuously collects storage device (SD) R/W data from read and write operations executed by memory devices 114. SD R/W data 120 represents all activity performed by memory devices 114, whether received from legitimate FS I/F 118 in OS 108 or from rogue FS I/F 120. In an embodiment, anomaly detector 120 periodically compares OS R/W data 116 received from anti-malware 104 to SD R/W data 118 to detect any one or more discrepancies and any one or more anomalies between the two sets of data that indicates potential illicit activity by ransomware 106. In an embodiment, the activity may be a read request by the ransomware followed by a particular pattern of write operations indicating unauthorized cryptographic processing (e.g., encryption) of data on memory devices 114. In an embodiment, an anomaly includes an abnormally high level of reads and/or writes in a selected time period. In an embodiment, an anomaly includes an abnormal ratio of reads to writes in a selected time period.

When anomaly detector 120 detects at least one anomaly, anomaly detector may cause one or more remediation actions to be taken by one or more of storage device controller 112, storage device 110, OS 108, and anti-malware 104 to counterattack against ransomware 106. In embodiments, remediation actions include preventing further write requests from ransomware 106 from being performed, preventing further read requests from ransomware 106 from being performed, stopping all processing by ransomware 106 (e.g., killing the ransomware process running on computing system 100), rolling back previous write operations to a previous state from a temporary write back cache, and so on. In another embodiment, if new data from ransomware 106 is written to a free block in memory device 114, the old data may be recovered if the block storing the old data has not yet been erased by a garbage collection process of storage device controller 112.

In an embodiment, anomaly detector 120 can indicate a lower alert priority (e.g., if low level I/O represented in SD R/W data 118 is exhibiting normal behavior) or a higher alert priority (e.g., if the behavior is not only inconsistent with OS R/W data 116 but also indicative of ransomware behavior).

In another embodiment, instead of being in storage device 110, anomaly detector 120 is a component of OS 108 running in a protected mode (for example, using Software Guard Extensions (SGX) commercially available from Intel Corporation). In an embodiment, anomaly detector 120 runs in a trusted execution environment (TEE) on computing system. In either of these embodiments, storage device controller 112 sends SD R/W data 118 over a trusted channel (e.g., host embedded controller interface (HECI)) to anomaly detector 120 running as a trusted agent. If anomaly detector 120 is not present in the OS 108 then anomaly detector 120 on storage device controller 112 will perform anomaly detection processing.

Figure 2:
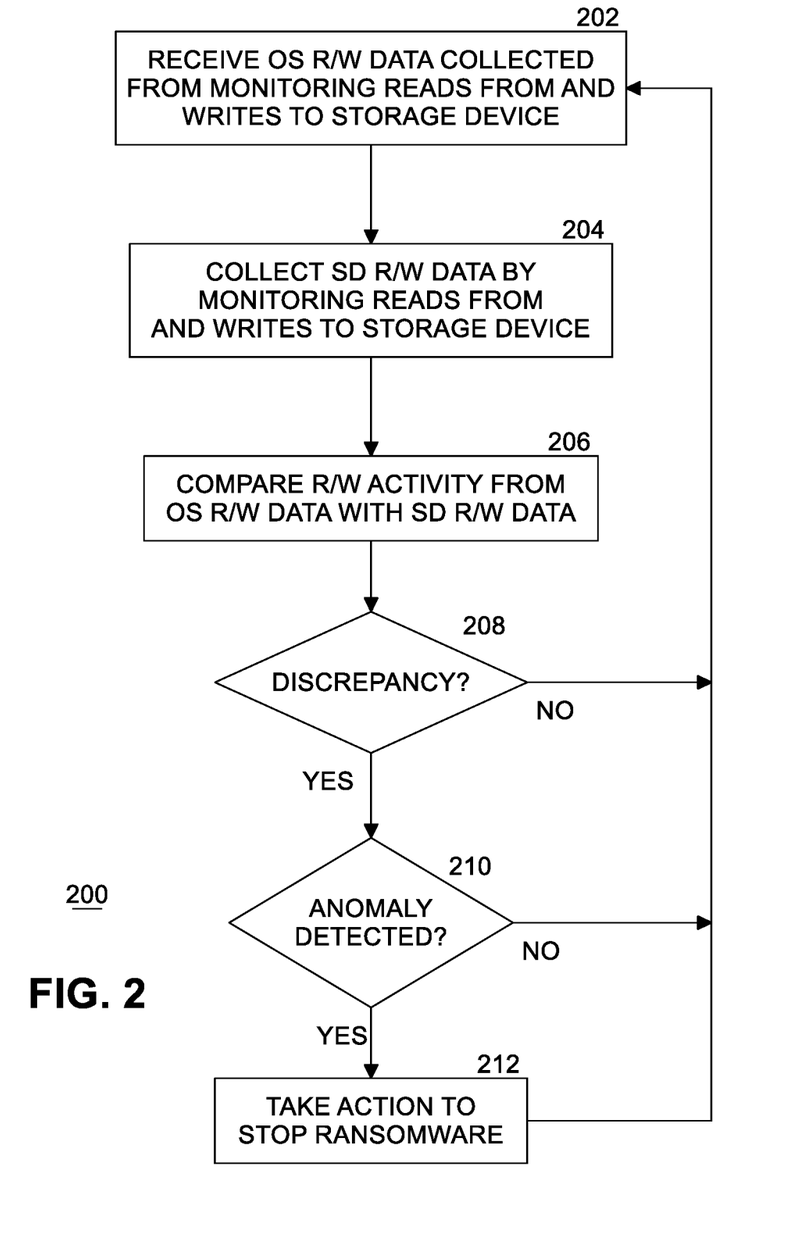
FIG. 2 is a flow diagram of a method of ransomware detection and remediation processing according to some embodiments.

FIG. 2 is a flow diagram of a method 200 of ransomware detection and remediation processing according to some embodiments. At block 202, anomaly detector 120 of storage device controller 112 of storage device 110 receives OS R/W data 116 collected from monitoring of reads from and writes to storage device 110 using legitimate FS I/F 118 over a first selected period of time. At block 204, anomaly detector 120 collects SD R/W data 118 over a second selected period of time, SD R/W data 118 capturing all read/write activity to memory devices 114 (whether received through FS I/F 118 or rogue FS I/F 120). In an embodiment, the first selected period of time is equal to the second selected period of time. At block 206, anomaly detector 120 periodically compares one or more metrics from OS R/W data 116 with SD R/W 118. If a discrepancy is detected (indicating that one or more metrics of OS R/W 116 do not match SD R/W 118), then further analysis is performed. In some cases, there may be legitimate reasons for a discrepancy. Legitimate actions of a user or processes of computing system 100 may affect FS I/F 118 in OS 108, which may then affect analysis of SD R/W data 118. For example, such actions and/or processes include defragmentation of memory devices 114 and malware scanning by anti-malware 104. In these scenarios, detecting one or more differences between OS R/W data 116 and SD R/W data 118 may indicate a discrepancy but not an anomaly resulting from ransomware activities. Anomaly detector 120 analyzes the discrepancy to determine if an anomaly is detected. In an embodiment, anti-malware 104 or OS 108 notifies storage device controller 112 when defragmentation or malware scanning is being performed. If an anomaly is detected at block 208, anomaly detector 120 causes one or more remediation actions to be taken to stop ransomware 106 at block 210. If no discrepancy is found or no anomaly is detected, processing continues with block 202.

In some embodiments, anomaly detector 120 monitors selected self-monitoring, analysis and reporting (SMART) technology attributes from operations by memory devices 114. SMART is an open standard used by storage devices and host computing systems to monitor storage device health and to report potential problems. Each storage device operates under a predefined set of SMART attributes and corresponding threshold values, of which the storage device should not pass during normal operation. SMART technology is commercially available with certain SSDs and Optane® technology memory devices from Intel Corporation. In these embodiments, OS R/W data 116 and SD R/W data 118 are SMART attributes.

Figure 3:
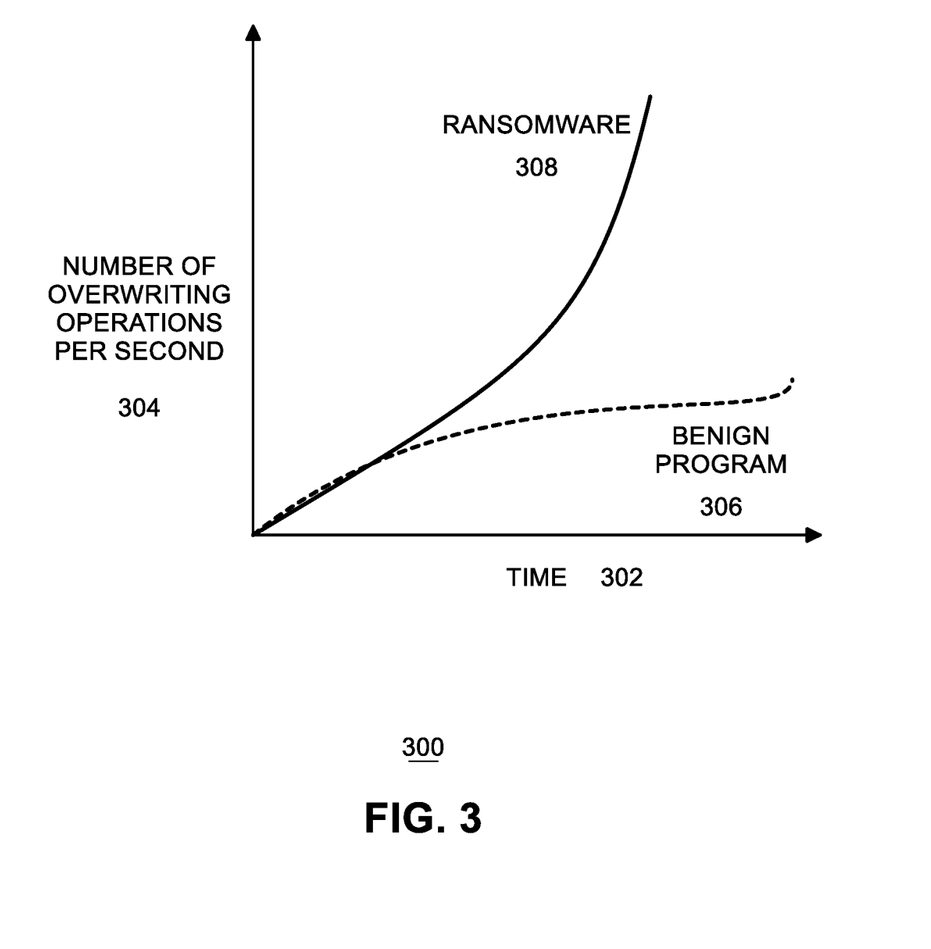
FIG. 3 is a graph of a characteristic of ransomware versus a benign program.

Values for metrics for read/write/overwrite activities of ransomware 106 are significantly different than for the same activities of a benign program. FIG. 3 is a graph 300 of a metric of ransomware 106 versus a benign program. In this example, the metric is the number of overwriting operations per second. In other examples, other metrics may be used. In graph 300, time 302 is on the X axis and the number of overwriting operations per second 304 is on the Y axis. Note that the curve 308 for ransomware is significantly higher than the curve 306 for a sample benign program. In an embodiment, anomaly detector 120 compares the metric (represented in OS R/W data 116 and SD R/W data 118), such as number of overwriting operations per second, between ransomware 106 and a known sample benign program to detect an anomaly (e.g., abnormal overwriting activity by ransomware 106).

In one embodiment, when OS R/W data 118 does not correspond to SD RW data 118, an anomaly indicative of malicious activity by ransomware 106 is present.

In another embodiment, anomaly detector 120 compares one or more metrics using attributes defined by SMART between ransomware 106 and a known sample benign program. Anomaly detector 120 uses one or more of these SMART attributes to detect anomalies. For example, in one embodiment, instead of comparing OS R/W data 116 with SD R/W data 118 at block 206, anomaly detector 120 compares a metric for a selected SMART attribute for ransomware 106 with the same metric for a known sample benign program. When the metrics values are more than a predetermined threshold apart, anomaly detector 120 detects an anomaly.

Figure 4:
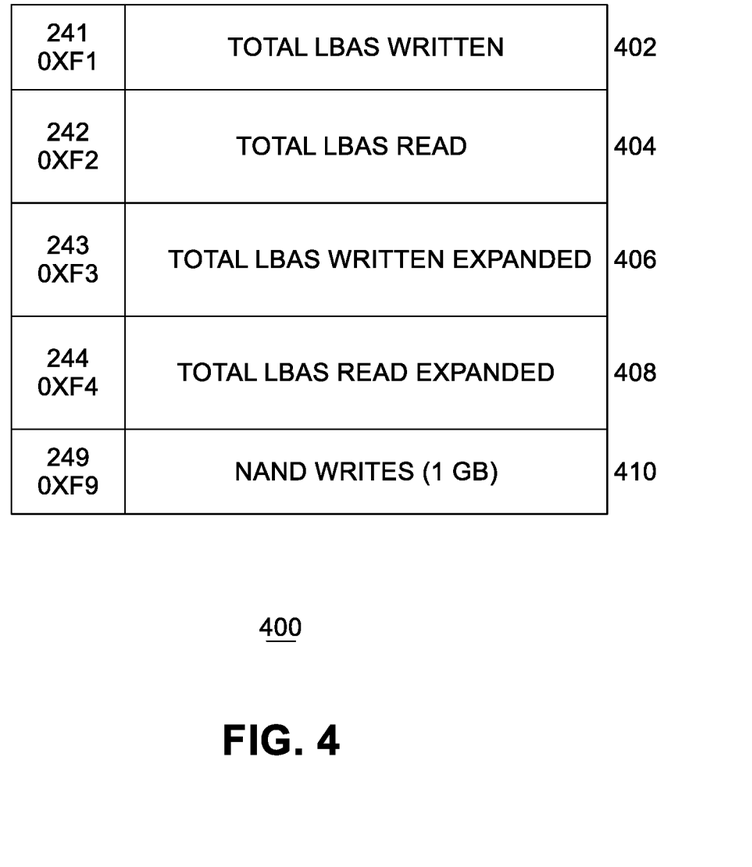
FIG. 4 is a table of metrics for reading data from and writing data to a storage device.

FIG. 4 is a table 400 of attributes for reading data from and writing data to a storage device. In an embodiment, OS R/W data 116 and SD R/W data 118 include one or more of these SMART attributes. A first SMART attribute with an identification (ID) code of 241 0XF1 is total logical block addresses (LBAs) written 402 by storage device 110. Total LBAs written 402 is the total count of the LBAs written for a selected time period (e.g., per second, per millisecond, etc.). A second SMART attribute with an ID code of 242 0XF2 is total LBAs read 404 by storage device 404. Total LBAs read 404 is the total count of the LBAs read for a selected time period. A third SMART attribute with an ID code of 243 0XF3 is total LBAs written expanded 406. Total LBAs written expanded 406 is the upper five bytes of a 12-byte total number of LBAs written 402. A fourth SMART attribute with an ID code of 244 0XF4 is total LBAs read expanded 408. Total LBAs read expanded 408 is the upper five bytes of a 12-byte total number of LBAs read 404. A fifth SMART attribute with an ID code of 249 0XF9 is NAND writes 410. NAND writes 410 is the count of the number of write operations to NAND (e.g., memory device 114) in 1 gigabyte (GB) increments for a selected time period.

In an embodiment, real time monitoring of SMART attributes is performed continuously by storage device controller 112 because such monitoring does not affect performance of storage device 110.

Figure 5:
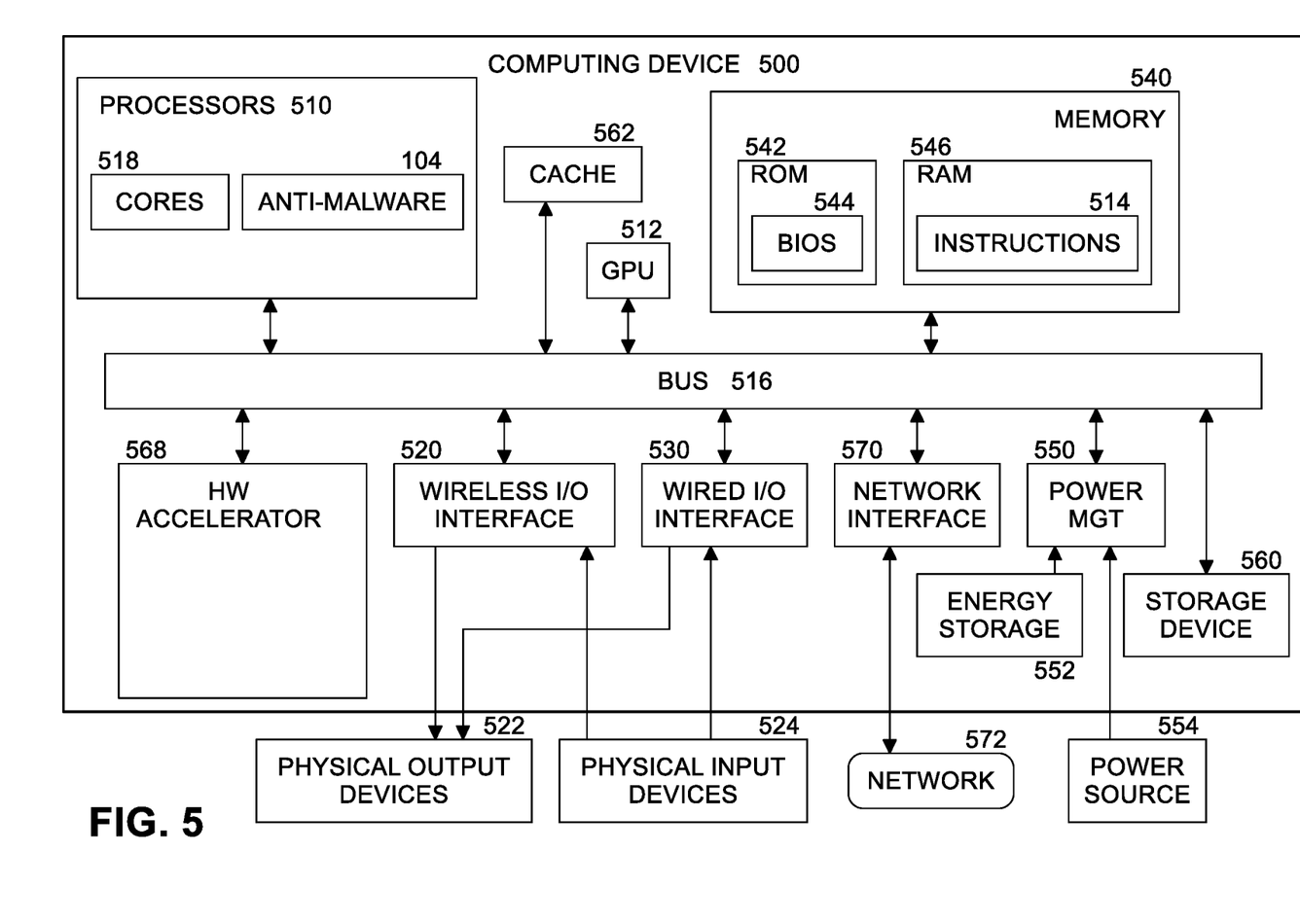
FIG. 5 is a schematic diagram of an illustrative electronic computing device to perform ransomware detection and remediation processing according to some embodiments.

FIG. 5 is a schematic diagram of an illustrative electronic computing device to perform ransomware detection and remediation processing according to some embodiments. In some embodiments, computing device 500 includes one or more processors 510 including one or more processors cores 518 and anti-malware 104. In some embodiments, the computing device 500 includes one or more hardware accelerators 568.

In some embodiments, the computing device is to implement ransomware detection and remediation processing, as provided in FIGS. 1 and 2.

The computing device 500 may additionally include one or more of the following: cache 562, a graphical processing unit (GPU) 512 (which may be the hardware accelerator in some implementations), a wireless input/output (I/O) interface 520, a wired I/O interface 530, memory circuitry 540, power management circuitry 550, non-transitory storage device 560, and a network interface 570 for connection to a network 572. The following discussion provides a brief, general description of the components forming the illustrative computing device 500. Example, non-limiting computing devices 500 may include a desktop computing device, blade server device, workstation, laptop computer, mobile phone, tablet computer, personal digital assistant, or similar device or system.

In embodiments, the processor cores 518 are capable of executing machine-readable instruction sets 514, reading data and/or instruction sets 514 from one or more storage devices 560 and writing data to the one or more storage devices 560. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 514 may include instructions to implement ransomware detection and remediation processing, as provided in FIGS. 1 and 2.

The processor cores 518 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 500 includes a bus or similar communications link 516 that communicably couples and facilitates the exchange of information and/or data between various system components including the processor cores 518, the cache 562, the graphics processor circuitry 512, one or more wireless I/O interfaces 520, one or more wired I/O interfaces 530, one or more storage devices 560, and/or one or more network interfaces 570. The computing device 500 may be referred to in the singular herein, but this is not intended to limit the embodiments to a single computing device 500, since in certain embodiments, there may be more than one computing device 500 that incorporates, includes, or contains any number of communicably coupled, collocated, or remote networked circuits or devices.

The processor cores 518 may include any number, type, or combination of currently available or future developed devices capable of executing machine-readable instruction sets.

The processor cores 518 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 5 are of conventional design. Consequently, such blocks need not be described in further detail herein, as they will be understood by those skilled in the relevant art. The bus 516 that interconnects at least some of the components of the computing device 500 may employ any currently available or future developed serial or parallel bus structures or architectures.

The system memory 540 may include read-only memory ("ROM") 542 and random-access memory ("RAM") 546. A portion of the ROM 542 may be used to store or otherwise retain a basic input/output system ("BIOS") 544. The BIOS 544 provides basic functionality to the computing device 500, for example by causing the processor cores 518 to load and/or execute one or more machine-readable instruction sets 514. In embodiments, at least some of the one or more machine-readable instruction sets 514 cause at least a portion of the processor cores 518 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 500 may include at least one wireless input/output (I/O) interface 520. The at least one wireless I/O interface 520 may be communicably coupled to one or more physical output devices 522 (tactile devices, video displays, audio output devices, hardcopy output devices, etc.). The at least one wireless I/O interface 520 may communicably couple to one or more physical input devices 524 (pointing devices, touchscreens, keyboards, tactile devices, etc.). The at least one wireless I/O interface 520 may include any currently available or future developed wireless I/O interface. Example wireless I/O interfaces include, but are not limited to: BLUETOOTH®, near field communication (NFC), and similar.

The computing device 500 may include one or more wired input/output (I/O) interfaces 530. The at least one wired I/O interface 530 may be communicably coupled to one or more physical output devices 522 (tactile devices, video displays, audio output devices, hardcopy output devices, etc.). The at least one wired I/O interface 530 may be communicably coupled to one or more physical input devices 524 (pointing devices, touchscreens, keyboards, tactile devices, etc.). The wired I/O interface 530 may include any currently available or future developed I/O interface. Example wired I/O interfaces include but are not limited to universal serial bus (USB), IEEE 1394 ("FireWire"), and similar.

The computing device 500 may include one or more communicably coupled, non-transitory, data storage devices 560. The data storage devices 560 may include one or more hard disk drives (HDDs) and/or one or more solid-state storage devices (SSDs). The one or more data storage devices 560 may include any current or future developed storage appliances, network storage devices, and/or systems. Non-limiting examples of such data storage devices 560 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 560 may include one or more removable storage devices, such as one or more flash drives, flash memories, flash storage units, or similar appliances or devices capable of communicable coupling to and decoupling from the computing device 500.

The one or more data storage devices 560 may include interfaces or controllers (not shown) communicatively coupling the respective storage device or system to the bus 516. The one or more data storage devices 560 may store, retain, or otherwise contain machine-readable instruction sets, data structures, program modules, data stores, databases, logical structures, and/or other data useful to the processor cores 518 and/or graphics processor circuitry 512 and/or one or more applications executed on or by the processor cores 518 and/or graphics processor circuitry 512 or storage device controller 112. In some instances, one or more data storage devices 560 may be communicably coupled to the processor cores 518, for example via the bus 516 or via one or more wired communications interfaces 530 (e.g., Universal Serial Bus or USB); one or more wireless communications interfaces 520 (e.g., Bluetooth®, Near Field Communication or NFC); and/or one or more network interfaces 570 (IEEE 802.3 or Ethernet, IEEE 802.11, or Wi-Fi®, etc.).

Processor-readable instruction sets 514 and other programs, applications, logic sets, and/or modules may be stored in whole or in part in the system memory 540. Such instruction sets 514 may be transferred, in whole or in part, from the one or more data storage devices 560. The instruction sets 514 may be loaded, stored, or otherwise retained in system memory 540, in whole or in part, during execution by the processor cores 518 and/or graphics processor circuitry 512.

The computing device 500 may include power management circuitry 550 that controls one or more operational aspects of the energy storage device 552. In embodiments, the energy storage device 552 may include one or more primary (i.e., non-rechargeable) or secondary (i.e., rechargeable) batteries or similar energy storage devices. In embodiments, the energy storage device 552 may include one or more supercapacitors or ultracapacitors. In embodiments, the power management circuitry 550 may alter, adjust, or control the flow of energy from an external power source 554 to the energy storage device 552 and/or to the computing device 500. The power source 554 may include, but is not limited to, a solar power system, a commercial electric grid, a portable generator, an external energy storage device, or any combination thereof.

For convenience, the processor cores 518, the graphics processor circuitry 512, the wireless I/O interface 520, the wired I/O interface 530, the storage device 560, and the network interface 570 are illustrated as communicatively coupled to each other via the bus 516, thereby providing connectivity between the above-described components. In alternative embodiments, the above-described components may be communicatively coupled in a different manner than illustrated in FIG. 5. For example, one or more of the above-described components may be directly coupled to other components, or may be coupled to each other, via one or more intermediary components (not shown). In another example, one or more of the above-described components may be integrated into the processor cores 518 and/or the graphics processor circuitry 512. In some embodiments, all or a portion of the bus 516 may be omitted and the components are coupled directly to each other using suitable wired or wireless connections.

Flowcharts representative of example hardware logic, machine readable instructions, hardware implemented state machines, and/or any combination thereof for implementing computing device 500, for example, are shown in FIG. 2. The machine-readable instructions may be one or more executable programs or portion(s) of an executable program for execution by a computer processor such as the processor 510 shown in the example computing device 500 discussed above in connection with FIG. 5, or a storage device controller 112 for a storage device 110 (such as one of physical output devices 522). The program may be embodied in software stored on a non-transitory computer readable storage medium such as a CD-ROM, a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware (such as storage device controller 112 of storage device 110). Further, although the example program is described with reference to the flowchart illustrated in FIG. 2, many other methods of implementing the example systems 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operationalamplifier (op-amp), a logic circuit, etc.) structured to perform the corresponding operation without executing software or firmware. In one embodiment, ransomware detection and remediation processing is performed at least in part by physical output device 522 (e.g., by storage device controller 112 of a storage device 110 such as an SSD).

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 2 may be implemented using executable instructions (e.g., computer and/or machine-readable instructions) stored on a non-transitory computer and/or machine-readable medium such as a hard disk drive, an SSD (e.g., storage device 110), a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to perform ransomware detection and remediation. The apparatus includes an anomaly detector; and a memory device coupled to the anomaly detector, the memory device having instructions stored thereon that, in response to execution by the anomaly detector, cause the anomaly detector to: receive operating system (OS) read/write data from an OS, the OS read/write data describing at least one of reads from and writes to a storage device over a file system interface of the OS; collect storage device read/write data, the storage device read/write data describing at least one of reads from and writes to the storage device; compare the OS read/write data to the storage device read/write data; determine if there is a discrepancy between the OS read/write data and the storage device read/write data; if there is a discrepancy, determine if there is an anomaly detected between OS read/write data and the storage device read/write data; and if there is an anomaly, cause a remediation action to be taken to stop a malware attack.

In Example 2, the subject matter of Example 1 can optionally include wherein the malware attack is a ransomware attack.

In Example 3, the subject matter of Example 2 can optionally include wherein the ransomware attack includes writing encrypted data to the storage device over a rogue file system interface.

In Example 4, the subject matter of Example 1 can optionally include wherein the OS read/write data and the storage device read/write data comprise at least one self-monitoring, analysis and reporting (SMART) technology attribute of read/write activity of the storage device.

In Example 5, the subject matter of Example 1 can optionally include wherein the OS read/write data is untrusted and the storage device read/write data is trusted.

In Example 6, the subject matter of Example 1 can optionally include wherein the remediation action comprises preventing further write operations by the malware.

In Example 7, the subject matter of Example 1 can optionally include wherein the remediation action comprises stopping operation of the malware.

In Example 8, the subject matter of Example 1 can optionally include wherein the storage device is a solid-state drive (SSD).

In Example 9, the subject matter of Example 1 can optionally include wherein the anomaly indicates a pattern of write operations to the storage device indicating unauthorized cryptographic processing of data.

In Example 10, the subject matter of Example 1 can optionally include wherein the anomaly indicates an abnormal ratio of reads to writes in a selected time period.

In Example 11, the subject matter of Example 1 can optionally include instructions to compare the collected storage device read/write data to storage device read/write data of a known benign program and detect an anomaly when the storage device read/write data is more than a predetermined threshold apart from the read/write data of the known benign program.

In Example 12, the subject matter of Example 1 can optionally include wherein the anomaly detector runs in a protected mode in the OS.

Example 13 is a method of ransomware detection and remediation. The method includes receiving operating system (OS) read/write data from an OS, the OS read/write data describing at least one of reads from and writes to a storage device over a file system interface of the OS; collecting storage device read/write data, the storage device read/write data describing at least one of reads from and writes to the storage device; comparing the OS read/write data to the storage device read/write data; determining if there is a discrepancy between the OS read/write data and the storage device read/write data; if there is a discrepancy, determining if there is an anomaly detected between OS read/write data and the storage device read/write data; and if there is an anomaly, causing a remediation action to be taken to stop a malware attack.

In Example 14, the subject matter of Example 13 can optionally include wherein the malware attack is a ransomware attack.

In Example 15, the subject matter of Example 14 can optionally include wherein the ransomware attack includes writing encrypted data to the storage device over a rogue file system interface.

In Example 16, the subject matter of Example 13 can optionally include wherein the OS read/write data and the storage device read/write data comprise at least one self-monitoring, analysis and reporting (SMART) technology attribute of read/write activity of the storage device.

In Example 17, the subject matter of Example 13 can optionally include wherein the remediation action comprises preventing further write operations by the malware.

In Example 18, the subject matter of Example 13 can optionally include wherein the remediation action comprises stopping operation of the malware.

In Example 19, the subject matter of Example 13 can optionally include wherein the anomaly indicates a pattern of write operations to the storage device indicating unauthorized cryptographic processing of data.

In Example 20, the subject matter of Example 13 can optionally include wherein the anomaly indicates an abnormal ratio of reads to writes in a selected time period.

Example 21 is at least one non-transitory machine-readable storage medium comprising instructions that, when executed, cause at least one processing device to at least perform ransomware detection and remediation. The instructions, when executed, receive operating system (OS) read/write data from an OS, the OS read/write data describing at least one of reads from and writes to a storage device over a file system interface of the OS; collect storage device read/write data, the storage device read/write data describing at least one of reads from and writes to the storage device; compare the OS read/write data to the storage device read/write data; determine if there is a discrepancy between the OS read/write data and the storage device read/write data; if there is a discrepancy, determine if there is an anomaly detected between OS read/write data and the storage device read/write data; and if there is an anomaly, cause a remediation action to be taken to stop a malware attack.

In Example 22, the subject matter of Example 21 can optionally include wherein the OS read/write data and the storage device read/write data comprise at least one self-monitoring, analysis and reporting (SMART) technology attribute of read/write activity of the storage device.

In Example 23, the subject matter of Example 21 can optionally include wherein the anomaly indicates a pattern of write operations to the storage device indicating unauthorized cryptographic processing of data.

In Example 24, the subject matter of Example 21 can optionally include wherein the anomaly indicates an abnormal ratio of reads to writes in a selected time period.

In Example 25, the subject matter of Example 21 can optionally include instructions to compare the collected storage device read/write data to storage device read/write data of a known benign program and detect an anomaly when the storage device read/write data is more than a predetermined threshold apart from the read/write data of the known benign program.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
a processor; and
a memory device coupled to the processor, the memory device having instructions stored thereon that, in response to execution by the processor, cause the processor to:
receive untrusted operating system (OS) read/write activity data from an OS, the untrusted OS read/write activity data describing at least one of reads from and writes to a storage device over a legitimate file system interface of the OS;
collect trusted storage device read/write activity data, the trusted storage device read/write activity data describing at least one of reads from and writes to one or more memory devices of the storage device over the legitimate file system interface and at least one rogue file system interface;
compare the untrusted OS read/write activity data to the trusted storage device read/write activity data;
determine if there is a discrepancy between the untrusted OS read/write activity data and the trusted storage device read/write activity data;
if there is a discrepancy, determine if there is an anomaly detected between untrusted OS read/write activity data and the trusted storage device read/write activity data; and
if there is an anomaly, cause a remediation action to be taken to stop a ransomware attack over the rogue file system interface.

2. The apparatus of claim 1, wherein the ransomware attack includes writing encrypted data to the storage device over the rogue file system interface.

3. The apparatus of claim 1, wherein the untrusted OS read/write activity data and the trusted storage device read/write activity data comprise at least one self-monitoring, analysis and reporting (SMART) technology attribute of a SMART standard of read/write activity of the storage device.

4. The apparatus of claim 1, wherein the remediation action comprises preventing further write operations by the ransomware.

5. The apparatus of claim 1, wherein the remediation action comprises stopping operation of the ransomware.

6. The apparatus of claim 1, wherein the storage device is a solid-state drive (SSD).

7. The apparatus of claim 1, wherein the anomaly indicates a pattern of write operations to the storage device indicating unauthorized cryptographic processing of data.

8. The apparatus of claim 1, wherein the anomaly indicates an abnormal ratio of reads to writes in a selected time period.

9. The apparatus of claim 1, further comprising instructions to compare the trusted storage device read/write activity data to storage device read/write activity data of a known benign program and detect an anomaly when the trusted storage device read/write activity data is more than a predetermined threshold apart from the read/write activity data of the known benign program.

10. A method comprising:
receiving untrusted operating system (OS) read/write activity data from an OS, the untrusted OS read/write activity data describing at least one of reads from and writes to a storage device over a legitimate file system interface of the OS;
collecting trusted storage device read/write activity data, the trusted storage device read/write activity data describing at least one of reads from and writes to one or more memory devices of the storage device over the legitimate file system interface and at least one rogue file system interface;
comparing the OS read/write data to the storage device read/write data;
determining if there is a discrepancy between the untrusted OS read/write activity data and the trusted storage device read/write activity data;
if there is a discrepancy, determining if there is an anomaly detected between untrusted OS read/write activity data and the trusted storage device read/write activity data; and
if there is an anomaly, causing a remediation action to be taken to stop a ransomware attack.

11. The method of claim 10, wherein the ransomware attack includes writing encrypted data to the storage device over the rogue file system interface.

12. The method of claim 10, wherein the untrusted OS read/write activity data and the storage device read/write data comprise at least one self-monitoring, analysis and reporting (SMART) technology attribute of a SMART standard of read/write activity of the storage device.

13. The method of claim 10, wherein the remediation action comprises preventing further write operations by the ransomware.

14. The method of claim 10, wherein the remediation action comprises stopping operation of the ransomware.

15. The method of claim 10, wherein the anomaly indicates a pattern of write operations to the storage device indicating unauthorized cryptographic processing of data.

16. The method of claim 10, wherein the anomaly indicates an abnormal ratio of reads to writes in a selected time period.

17. At least one non-transitory machine-readable storage medium comprising instructions that, when executed, cause at least one processing device to at least:
receive untrusted operating system (OS) read/write activity data from an OS, the untrusted OS read/write activity data describing at least one of reads from and writes to a storage device over a legitimate file system interface of the OS;
collect trusted storage device read/write activity data, the trusted storage device read/write activity data describing at least one of reads from and writes to one or more memory devices of the storage device over the legitimate file system interface and at least one rogue file system interface;
compare the untrusted OS read/write activity data to the trusted storage device read/write activity data;
determine if there is a discrepancy between the untrusted OS read/write activity data and the trusted storage device read/write activity data;
if there is a discrepancy, determine if there is an anomaly detected between the untrusted OS read/write activity data and the trusted storage device read/write activity data; and
if there is an anomaly, cause a remediation action to be taken to stop a ransomware attack.

18. The at least one non-transitory machine-readable storage medium of claim 17, wherein the untrusted OS read/write activity data and the trusted storage device read/write activity data comprise at least one self-monitoring, analysis and reporting (SMART) technology attribute of a SMART standard of read/write activity of the storage device.

19. The at least one non-transitory machine-readable storage medium of claim 17, wherein the anomaly indicates a pattern of write operations to the storage device indicating unauthorized cryptographic processing of data.

20. The at least one non-transitory machine-readable storage medium of claim 17, wherein the anomaly indicates an abnormal ratio of reads to writes in a selected time period.

21. The at least one non-transitory machine-readable storage medium of claim 17, further comprising instructions to compare the trusted storage device read/write activity data to storage device read/write activity data of a known benign program and detect an anomaly when the trusted storage device read/write activity data is more than a predetermined threshold apart from the read/write activity data of the known benign program.

\* \* \* \* \*